United States Patent [19]

Gillis et al.

[11] Patent Number: 4,850,014
[45] Date of Patent: Jul. 18, 1989

[54] MULTIPLE DWELLING INTERFACE BOX

[75] Inventors: Michael H. Gillis, Mico, Tex.;
Michael D. Field, Hutchinson, Minn.

[73] Assignee: Communications Systems, Inc., Hector, Minn. ; a part interest

[21] Appl. No.: 24,277

[22] Filed: Mar. 10, 1987

[51] Int. Cl.$^4$ .............................................. H04M 9/00
[52] U.S. Cl. ................................... 379/399; 361/356; 439/133; D14/240
[58] Field of Search ................. 379/399, 30, 412, 442, 379/429, 29, 27, 419, 420; 439/95, 377, 709, 712, 715, 716, 718, 722; 220/3.8; 361/333, 334, 426, 356, 56, 91, 419; D14/52; D13/40

[56] References Cited

U.S. PATENT DOCUMENTS

| | | | |
|---|---|---|---|
| 4,488,008 | 12/1984 | Dellinger et al. | 379/30 |
| 4,516,818 | 5/1985 | Johnston et al. | 379/397 X |
| 4,560,839 | 12/1985 | Dillard | 379/399 |
| 4,624,514 | 11/1986 | Smith | 379/412 |
| 4,647,725 | 3/1987 | Dellinger et al. | 329/29 |
| 4,700,384 | 10/1987 | Meyer | 379/438 |
| 4,729,059 | 3/1988 | Wang | 361/356 |
| 4,741,032 | 4/1988 | Hampton | 379/399 |
| 4,749,359 | 6/1988 | White | 439/133 |

OTHER PUBLICATIONS

Suttle Apparatus Corporation Advertising Sheet, Model SE-104 entitled "Demarcation or Whose Fault Is It?" (publication at unknown).

Lippincott Industries Inc. Brochures, Models GL-700 and GL-600 Multi-Unit Network Interface Device (publication date unknown).

Siecor Corporation Brochure, ML500 Series Multiline Network Interface, published 1986.

Keptel Brochure, Model ML-5 entitled "An Interface System for Today . . . And Tomorrow", published Apr. 1986.

Keptel Brochure, Model SNI-5000, entitled "Tomorrow's Network Interface System . . . Today", published Oct. 1985.

*Primary Examiner*—Jin F. Ng
*Assistant Examiner*—Randall S. Vaas
*Attorney, Agent, or Firm*—Kinney & Lange

[57] ABSTRACT

A multiple dwelling interface box has a plurality of individual customer compartments to provide distribution to individual customers from one secure compartment housing communication company equipment. The box will contain up to six single or six two line modular customer interfaces. The invidual securable compartments are provided for easy invidual subscriber access on a panel or partition that hinges to provide access to the telephone company equipment, but which panel can be locked to prevent customer access to the communication company equipment.

11 Claims, 3 Drawing Sheets

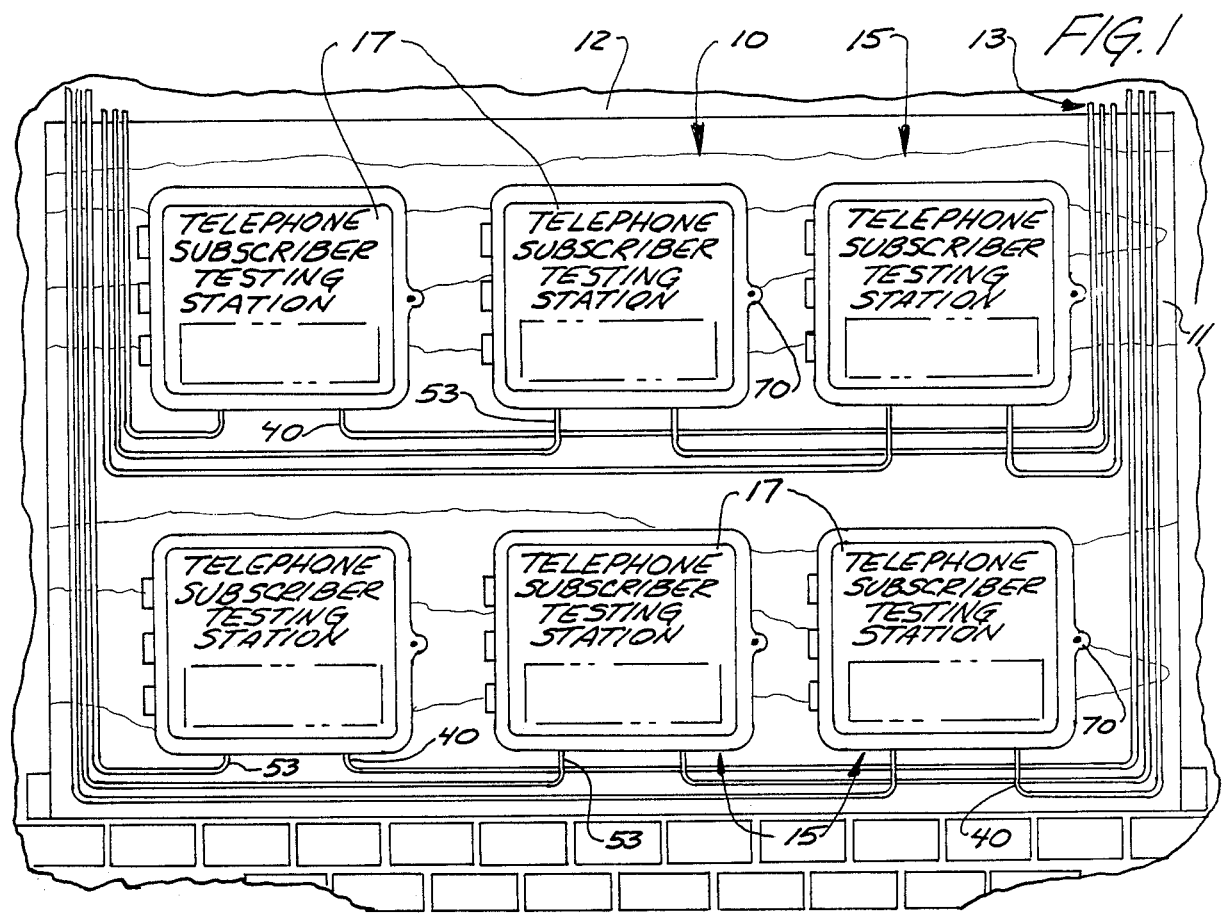
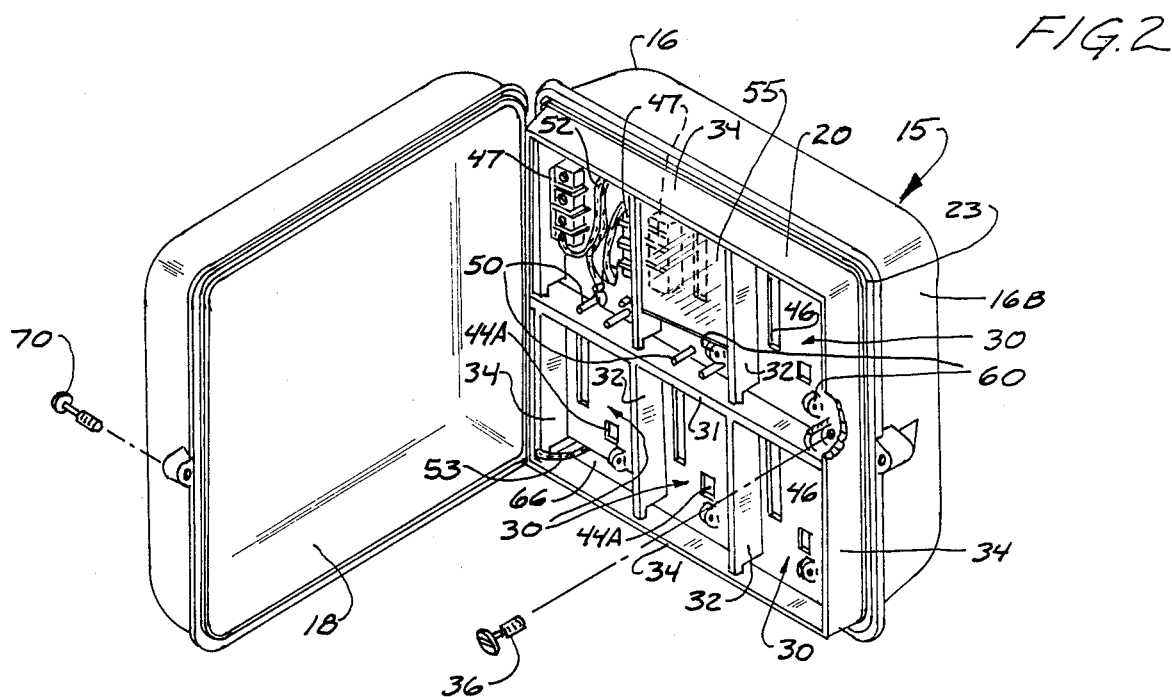

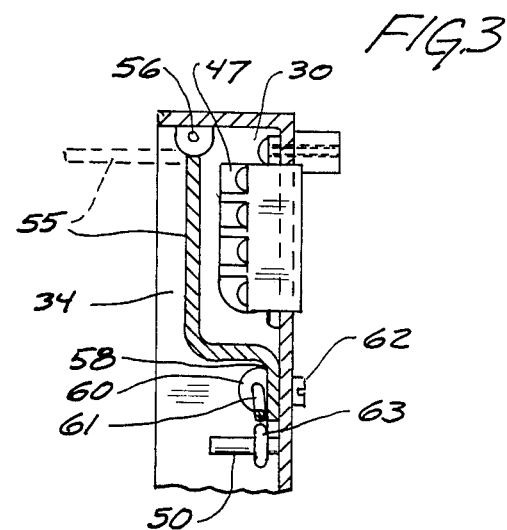
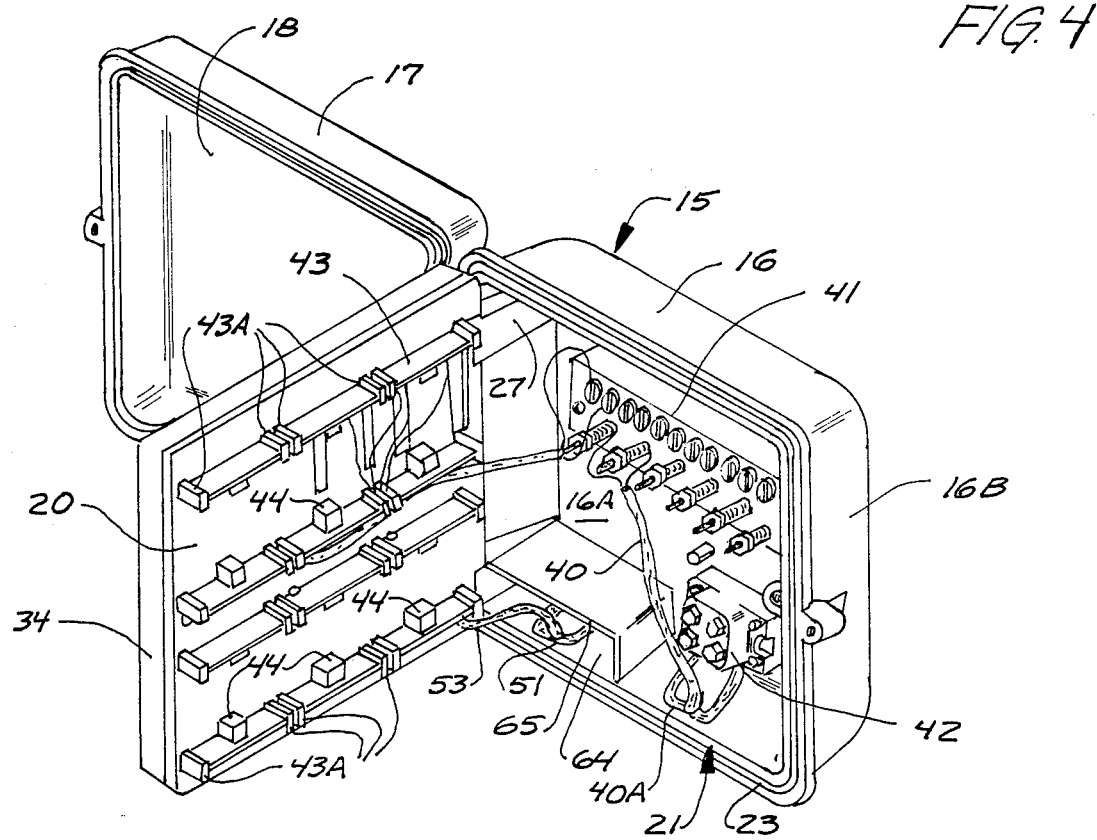

MULTIPLE DWELLING INTERFACE BOX

BACKGROUND OF THE INVENTION

1. Field of the Invention

The present invention relates to a multiple dwelling communication distribution box that provides for security for individual subscribers as well as common security for all of the incoming communication company equipment (called Telco equipment). The box has great modularity and can be utilized with a plurality of units mounted to the same mounting board or other type of mounting.

2. Description of the Prior Art

Various types of demarcation or junction boxes have been advanced for coupling Telco equipment to equipment of individual subscribers. For example, U.S. Pat. No. 4,560,839, issued Dec. 24, 1985 to Dillard shows a type of a telephone junction box that includes a base member for incoming telephone supply equipment and a locking arrangement with a separate panel thereon for separating out the telephone company equipment from the subscriber equipment. However, the box is difficult to get into, and does not provide coupling for multiple subscribers in one unit.

U.S. Pat. No. 4,488,008, issued to Dellinger et al. on Dec. 11, 1984 also shows a telephone network interface device having an individual compartment for a single user, and a separate compartment for the telephone company equipment. It does not show multiple subscriber compartments carried on a hinging security panel that secures the incoming Telco equipment from intrusion and which permits the compact construction and ease of use.

Additionally, the assignee of the present application has provided a modular indoor telephone line demarcation box, that isolates the telephone company equipment and incorporates an area for providing a modular jack for the user.

A further type of individual demarcation box for exterior mounting is also sold by the assignee of the present invention, but the box does not include the multiple compartments that are individually lockable, and which have clear covers so that the wiring can be observed from the exterior, with a single security partition or panel that carries the individual customer compartment and which can be unlatched and opened to permit access to the telephone company equipment, including line protectors, circuit boards and terminal blocks.

SUMMARY OF THE INVENTION

A multiple dwelling interface box comprises a single housing that mounts incoming communicaton company lines and equipment (sometimes called Telco equipment) in a first chamber or compartment and has a swingable locking partition that overlies the first compartment, and on the surface of the partition opposite from the first compartment, a plurality of individual compartments for the individual customers or subscribers are formed. The partition can be effectively locked to prevent access to the first compartment . The housing includes a cover that overlies the partition and encloses both the customer compartments and the first compartment.

Each of the individual customer compartments is made up as a separate subscriber unit for either one or two lines, and each has a cover that is individually lockable, so the subscriber's lines cannot be tampered with.

The box has gasketing on the cover to make the box weatherproof. As shown there are six compartments for the individual subscribers. The box assemblies lend themselves well to modular mounting so that a plurality of these boxes can be mounted onto a common board or pedestal, and each contains the necessary Telco protection equipment that is common for all of the invididual subscribers. The Telco equipment is accessible only by the telephone company personnel (individually lockable). The box provides quick individual access to a multiple number of user lines.

The box is formed so the individual user line can be routed out of the box through a separate passageway which is not open to the Telco equipment. The partition also can,, carry circuit boards and the like on the side facing,. the first compartment.

BRIEF DESCRIPTION OF THE DRAWINGS

FIG. 1 is a front view of a typical indoor panel mounting, showing the multiple dwelling interface boxes made according to the present invention mounted in a modular fashion thereon with the telephone company incoming line and individual subscriber lines leading out;

FIG. 2 is a perspective view of one of the multiple dwelling interface boxes shown in FIG. 1 with a cover in an open position to provide access to the individually closable and lockable customer equipment compartments;

FIG. 3 is a vertical sectional view through one of the customer equipment compartments shown in FIG. 1, illustrating schematically a clear polycarbonate cover overlying the individual customer or subscriber equipment;

FIG. 4 is a perspective view similiar to that shown in FIG. 2, with a lockable partition board swung open to provide access to the telephone company equipment;

DETAILED DESCRIPTION OF THE PREFERRED EMBODIMENTS

Figure 5:
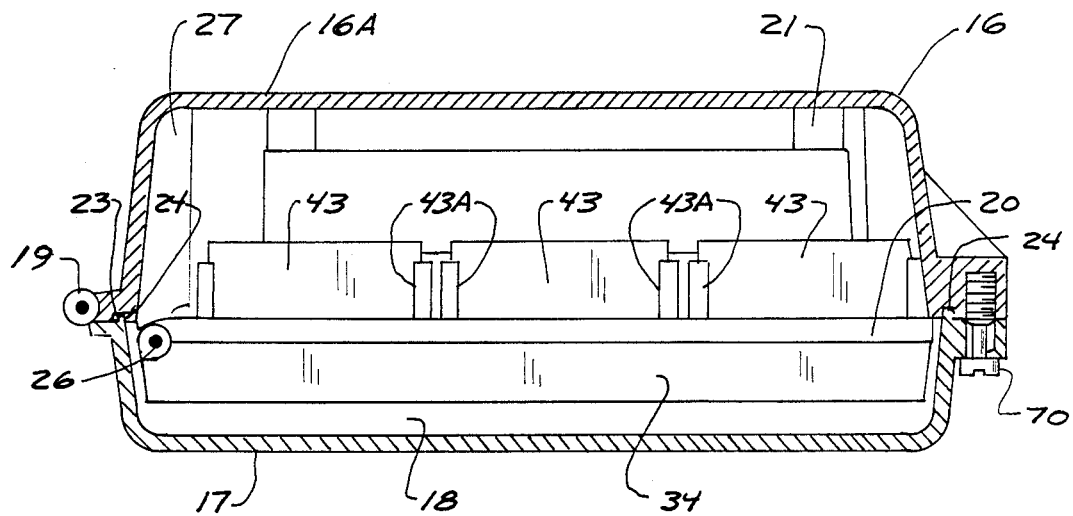
FIG. 5 is a transverse sectional view of a multiple dwelling interface box of the present invention with the covers in the closed position.

Referring to FIG. 1, an indoor telephone distributor panel assembly 10 includes a backboard 11 fixed to a wall 12. A Telco cable 13 is provided and individual subscriber lines lead from the boxes 15. A plurality of individual multiple dwelling interface (MDI) boxes or housings 15 made according to the present invention are mounted on the backboard 11. The boxes 15 are mounted onto the backboard in a desired manner, and as can be seen there are six multiple dwelling interface boxes 15 illustrated. Each of the individual boxes 15 is made to provide service to six individual subscribers, with each subscriber having either one or two lines, so up to thirty-six customers or subscribers can be serviced with the multiple distribution interface boxes shown in FIG. 1.

The multiple dwelling interface boxes provide telephone subscriber connecting and test interface stations that carry the subscriber lines to the dwelling or office unit. The boxes provide a common Telco supply, that is, common for all customers being serviced, and separated subscriber line connection compartments for multiple dwelling units.

Referring to FIGS. 2, 3 and 4, in particular, the construction of an individual multiple dwelling interface box 15 is illustrated. The boxes or housings 15 each include a base portion 16 having a back wall 16A (FIG. 4) and peripheral walls 16B defining an interior compartment 21, and a cover portion 17 that has a front wall 17A and peripheral walls 17B defining a chamber 18. A hinged security partition wall 20 is hinged to one side wall of portion 16. The partition 20 forms a security cover for the telephone company equipment chamber or compartment indicated generally at 21 (see also FIG. 5).

The cover portion 17 is hinged to the base portion 16 with suitable hinges indicated at 19 in FIG. 5 (any desired type of hinges can be used) and the mating edges of the cover and base portions interfit at the periphery where they meet, generally as shown at 23. Suitable gaskets 24 are provided in the groove 23 to provide a weatherproof sealed enclosure that is defined by the cover and base portions of the box or housing 15.

The security partition wall 20 is pivotally mounted or hinged as at 26 (FIG. 5) with suitable hinge members that are made in a desired manner. The partition and hinges are supported on hinge bosses 27 along one side wall of base portion 16. Hinging to either the cover or base portion is satisfactory so long as the partition secures the Telco equipment chamber when the housing is initially opened.

Figure 6:
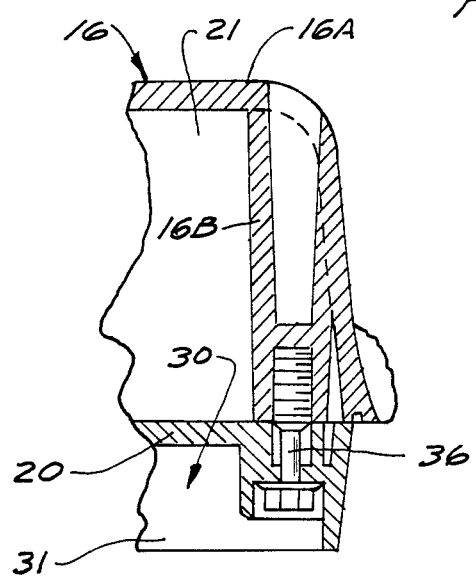
FIG. 6 is a fragmentary sectional view showing the lock arrangement for the partition or inner panel used to provide security for the communication company equipment.

The partition wall 20 has a customer access side 30 that is divided into a number of individual customer equipment compartments as shown at 31, and each of these customer equipment compartments is defined by vertical divider walls 32, and a horizontal divider wall 33 that are positioned within a peripheral wall 34 that extends around the periphery of the hinged partition wall 20. The individual compartments 30 are thus enclosed by walls, and the backs of these compartments is the partition wall 20. As shown there are six individual customer equipment compartments, and the partition 20 is of size so that it completely covers and encloses the Telco equipment chamber or compartment 21 when the partition wall 20 is in its position as shown in FIG. 2. The chamber or compartment 21 thus forms a security compartment When it is closed and locked. As shown in FIG. 6 a lock cam screw 36 can be used and threaded into an opening boss provided on the base portion 16 to provide the locking action. The cam screw 36 is a fastener that is used by Telco service persons because it requires a special socket to operate. This cam screw then forms a lock for the partition wall 20. Other types of locks can be utilized. For example locks may be tamperproof seals or can be devices only operated with special keys or tools.

As shown in FIG. 4, the incoming telephone lines, for example one that holds six pairs of wires indicated at 40, comes through a provided grommeted aperture. The wires go to a distribution block indicated at 41, that can be either protected (locked) or unprotected. The security compartment 21 also has adequate room to provide line protectors of conventional design indicated generally at 42 to be mounted. These are conventional telephone company equipment devices, and the chamber 21 has adequate space for them. Bosses or support pegs 42A molded on back wall 16A form supports for other equipment as well. The side of the partition 20 facing chamber or compartment 21 as shown, has support lugs 43A integral therewith which have slots for receiving circuit boards behind each customer compartment 30. The boards carry modular connectors 44 that are accessible through openings 44A molded in the partition wall 20 and covered with a removable plug blank until used.

The wall 20 also can have suitable molded-in slot openings 46 for receiving terminal blocks 47 in a conventional manner. These slots 46 likewise can be covered with a snap-in cover or blank until used. One end of the terminal block fits over the edge of the slot 46 and the other end is screwed into place. A separate terminal block is in each of the separate customer equipment compartments on the opposite side of wall 20 from the Telco equipment chamber. Individual customer input lines 52 are connected between the Telco terminals on block 41 and terminal block 47 in each customer compartment. Further, the partition wall 20 supports strain relief pegs 50 in each of the individual customer equipment compartments, so that the individual customer output lines 53 can be strain relieved before they are passed out of the box. Individual customer lines 53 are connected to terminals on connector block 41 and then lines 53 are passed through an opening in wall 20 to a chamber 64 formed by a divider wall 65 (FIG. 4) that extends from wall 16A to the partition wall 20 (with wall 20 in its position shown in FIG. 2). The wall 65 separates the outgoing customer wires or lines from the Telco equpment while permitting the lines 53 to be passed out a grommeted opening 51 in the bottom wall to base portion 16 of the housing 15. The wall 20 has an opening 66 leading to this passageway 64, and wall 16A also has such openings. The wall 65 seals the outlet opening 52 for the lines 53 from the Telco equipment.

As shown in FIGS. 2 and 3, each of the individual compartments 30 is provided with a hinged security cover 55 that is made of clear polycarbonate, and thus the interior of each of the compartments 30 can be viewed from the exterior without undoing the covers.

A hinge indicated at 56 for the cover 55 can be of any desired configuration and generally these hinges are snap molded hinges. The covers 55 have an offset lip 58 that is provided with an opening through which a hasp type lock lug 60 will pass. The lock lug 60 has an opening 61 that can be used for a security tie or small padlock indicated at 63 for locking the individual user compartment 30 so that each set of customer equipment in the multiple dwelling interface box 15 is protected by a secure individual lock. The lug 60 is held against the wall 20 with a screw 62 so that a Telco employee can override the locks on covers 55 once the partition wall 20 is opened by loosening cam screw 36. When the screw 62 is removed, lug 60 will be released so the associated cover 55 can be lifted without taking off the padlock 63.

The equipment that is mounted in the telephone company compartment or chamber 21 can be any desired type of equipment including protector terminals, connection blocks or the like. Also suitable printed circuit boards can be mounted in this compartment 21 for specialty equipment. The Telco compartment is secure, and is not disturbed by customers or companys checking their own customer interface equipment or by hooking up customer exchanges or equipment. The wall 65 separates the customer wire passing out of box 15. The wires 53 can be run from the compartments along the hinged side of the partition wall 20 and to the bottom of wall 21, through opening 66 and through passageway 64 and thus separate from the telphone company equipment. The incoming wires 52 are run over to the hinge side of the partition wall 20 before passing to the boards 43 so the wires are not substantially strained when partition wall 20 is opened.

The access to the subscriber units 30 is done merely by removing an ordinary screw 70 to open the cover portion. The screw 70 threads into a provided opening 71 in a boss 72 that is formed on the side of the interface box 15.

The mounting for the individual circuit boards 43 and the modular jacks 44 is easily done by slipping them into slots in the provided brackets 43A on the backside of the security panel. The boards 43, modular jacks 44, and terminal blocks 47 can be added as customer requirements appears. Each customer compartment thus serves one customer from the common Telco equipment.

Although the present invention has been described with reference to preferred embodiments, workers skilled in the art will recognize that changes may be made in form and detail without departing from the spirit and scope of the invention.

What is claimed is:

1. A multiple customer telephone interface box apparatus comprising:
   an outer housing including a housing base portion, and a housing cover portion pivotally connected together along one side thereof, at least one of said portions defining a first chamber, the cover portion being pivotable to an open position;
   a security partition hingedly connected to at least one housing potion and positioned to overlie and enclose the first chamber and having a first surface facing the first chamber and a second surface facing outwardly form the first chamber;
   first means to mount communication company owned equipment on the interior of the first chamber;
   first means for lockably latching said security partition in position overlying the first chamber;
   second means on the second surface of said security partition for defining individual, separated customer equipment compartments for mounting customer communication distribution equipment;
   separate cover means for individually lockably covering each of said individual customer equipment compartments, said separate cover means being accessible when the cover portion is moved to its open position without operating said first means; and
   third means for retaining said cover portion and base portion in a closed position enclosing the security partition, whereby opening the cover portion provides access to the separate customer equipment compartments on said security partition, but the first chamber remains unaccessible until said first means is unlatched and said security partition is hingedly moved to an opened position.

2. The apparatus as specified in claim 1 wherein said security partition is hingedly connected to said base portion.

3. The apparatus of claim 1 wherein the separate customer equipment compartments are defined by walls extending outwardly from the second surface of the security partition.

4. The apparatus as specified in claim 1 wherein said security partition includes aperture means for permitting communication lines to pass from the first chamber to the second surface of said security partition.

5. The apparatus as specified in claim 4 and a passageway forming wall within the first chamber defining a passageway extending from an exterior wall of said housing portion defining the first chamber and positioned parallel to said security partition, said security partition having an aperture aligning with the passageway defined by said passageway forming wall, whereby wires can be passed through the passageway defined by said passageway forming wall from the surface of the partition having the second means thereon to the exterior of the housing without being open to the first chamber containing the communication company equipment.

6. The apparatus as specified in claim 1 and seal means for forming a weatherproof seal between the two portions of said housing when the portions are in closed position.

7. The apparatus as specified in claim 3 and fourth means for removably receiving and supporting circuit boards mounted on the first surface of said security partition, whereby the fourth means permit mounting individual circuit boards for each of the individual customer compartments on the first surface of the security partition.

8. The apparatus as specified in claim 1 wherein each of said cover means for said customer equipment compartments is transparent.

9. The apparatus as specified in claim 1 wherein said cover means for said customer equipment compartments have means cooperating with the security partition for locking the cover means in position overlying customer equipment in such compartments.

10. A multiple customer telephone interface box apparatus comprising:
    an outer housing including a base portion defining a first equipment chamber;
    a security partition hingedly connected to the base portion and positioned to cover the first chamber in a first position of the partition and being movable on its hinged connection to a second position permitting access to the first chamber, the security partition having a first partition side surface facing the first chamber and a second partition side surface facing in an opposite direction from the first partition side surface;
    first means to lockably latch said security partition in its first position;
    second means on the second side surface of said security partition defining individual, separated customer equipment compartments for mounting customer communicating distribution equipment;
    an openable cover member hinged to the base portion that encloses the customer equipment compartments and the security partition in a first position and opens to permit access to the customer equipment compartments, said security partition also being movable to its second position with the cover member open; and
    individual lockable cover means for each of said customer equipment compartments.

11. The apparatus of claim 10 wherein the security partition has edges, the hinge connection of the security partition being along a first edge thereof and wherein the first means comprises a locking member along a second edge of the security partition that is accessible only when the cover member is open.

* * * * *

UNITED STATES PATENT AND TRADEMARK OFFICE
CERTIFICATE OF CORRECTION

PATENT NO. : 4,850,014
DATED : July 18, 1989
INVENTOR(S) : Michael D. Field et al.

It is certified that error appears in the above-identified patent and that said Letters Patent is hereby corrected as shown below:

Column 5, line 33, delete "potion" and insert --portion--.

Column 5, line 36, delete "form" and insert --from--.

Column 6, line 52, delete "communicating" and insert --communication--.

Signed and Sealed this

Twenty-ninth Day of May, 1990

Attest:

HARRY F. MANBECK, JR.

*Attesting Officer*   *Commissioner of Patents and Trademarks*